United States Patent [19]

Miller, II et al.

[11] Patent Number: 4,480,178
[45] Date of Patent: Oct. 30, 1984

[54] TUNING ARRANGEMENT FOR INTERFACING CREDIT CARD-LIKE DEVICE TO A READER SYSTEM

[75] Inventors: Robert R. Miller, II, Convent Station; Charles Small, Freehold; John H. Stothoff, Plainsboro, all of N.J.

[73] Assignee: AT&T Information Systems, Holmdel, N.J.

[21] Appl. No.: 481,832

[22] Filed: Apr. 4, 1983

[51] Int. Cl.³ .............................................. G06K 5/00
[52] U.S. Cl. .................................... 235/380; 235/487; 363/82
[58] Field of Search .................. 363/82, 259, 263; 323/267; 235/380, 487; 333/17

[56] References Cited
U.S. PATENT DOCUMENTS 2,302,893 11/1942 Roberts ................................ 171/242
2,838,658 6/1958 Vogel et al. ........................... 333/17
4,419,723 12/1983 Wilson ............................... 363/82 X

OTHER PUBLICATIONS

*Electronic Design* 6, Mar. 15, 1977, "Revisiting the Cross-Field Inductor," by T. A. O. Gross, pp. 82-85.

Primary Examiner—Harold I. Pitts
Attorney, Agent, or Firm—S. R. Williamson

[57] ABSTRACT

A circuit for maximizing power transfer from a station to an interactive memory card via a capacitive interface. A reader system in the station generates an ac signal which provides operating power that is transferred to the card through the capacitive interface formed when the card is placed against a window on the station. The ac signal from the station is directed through a series resonant circuit to the card. The capacitive interface between the station and card make up the capacitive element of the resonance circuit while the series combination of the secondary of a transformer and an electrically variable inductor form the inductive element. Use of the variable inductor allows the station to tune the circuit to resonance and cancel the capacitive element, thereby maintaining maximum power transfer to the card.

16 Claims, 4 Drawing Figures

TUNING ARRANGEMENT FOR INTERFACING CREDIT CARD-LIKE DEVICE TO A READER SYSTEM

BACKGROUND OF THE INVENTION

1. Technical Field

This invention relates to a communication system which uses electronic memory cards and, more particularly, to a system which activates such cards through a contactless interface.

2. Description of the Prior Art

Memory cards of the past have been read and written into by various contact methods. One problem that arises if metal contacts are used is increased ohmic resistance due to the oxidation that takes place on the contact surfaces. In addition, the contacts, while in the exposed position, allow airborne particles to deposit on the surfaces decreasing the contact area. Inasmuch as energy for reading and writing into a card is transferred from a reader system in a station to the card via these contacts, there is a loss in the amount of energy transferred after some time of use, rendering the card inoperative.

SUMMARY OF THE INVENTION

The present invention eliminates the need for metallic contacts in reading and writing data into a memory card and utilizes an automatic tuning circuit to ensure continuous maximum transfer of energy from a station to the card via a capacitive coupling arrangement. This arrangement comprises metallic plates with outer dielectric surfaces both on the card and the reader and is formed when each plate on the card is mated with its corresponding plate on the reader. In the transfer of energy to the card, the reader generates a high frequency signal which transfers the energy through the capacitively coupled surfaces. To maximize the efficiency of this energy transfer, current for the card flows through a series resonant circuit in both the reader and the card. The metallic plates at the interface of the card and station form the capacitive element of the resonant circuit, while the series combination of the secondary of a voltage step-up transformer and an electrically variable inductor form the inductive element. Use of the variable inductor allows the station to cancel the reactance of the capacitors and tune the circuit to resonance. The current to the card and thus the transfer of energy from the station to the card is thereby maximized.

BRIEF DESCRIPTION OF THE DRAWING

The invention and its mode of operation will be more readily understood from the following detailed description when considered in connection with the accompanying drawings in which.

DETAILED DESCRIPTION

Figure 1:
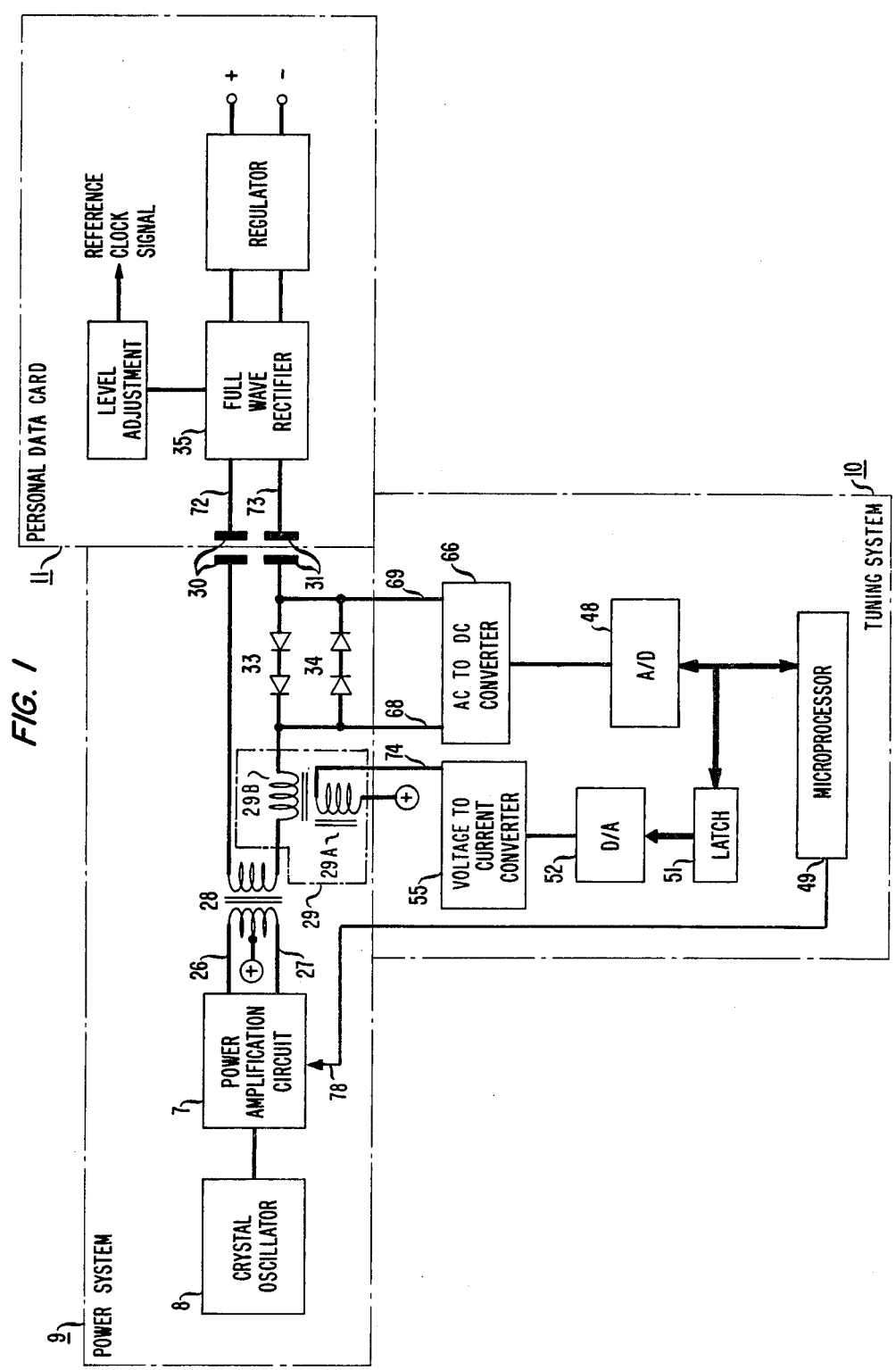
FIG. 1 is a block diagram illustrating the major functional components of a Personal Data Card (PDC), and the associated power and tuning systems in a companion PDC reader.

Referring now to FIG. 1, there is shown a power system 9 comprising a crystal oscillator 8, a power amplification circuit 7, a transformer 28, a variable inductor 29, and a parallel pair of diodes 33, 34 interconnected with an automatic tuning system 10 comprising an ac-to-dc converter 66, an Analog-to-Digital converter (A/D) 48, a latch 51, and a Digital-to-Analog converter (D/A) 52. A microprocessor 49, and, a voltage-to-current converter 55 are also in the automatic tuning system 10 and work together to supply maximum power to a Personal Data Card (PDC) 11 and to provide a clock signal to a microcomputer (not shown) in the PDC 11.

Figures 2, 3:
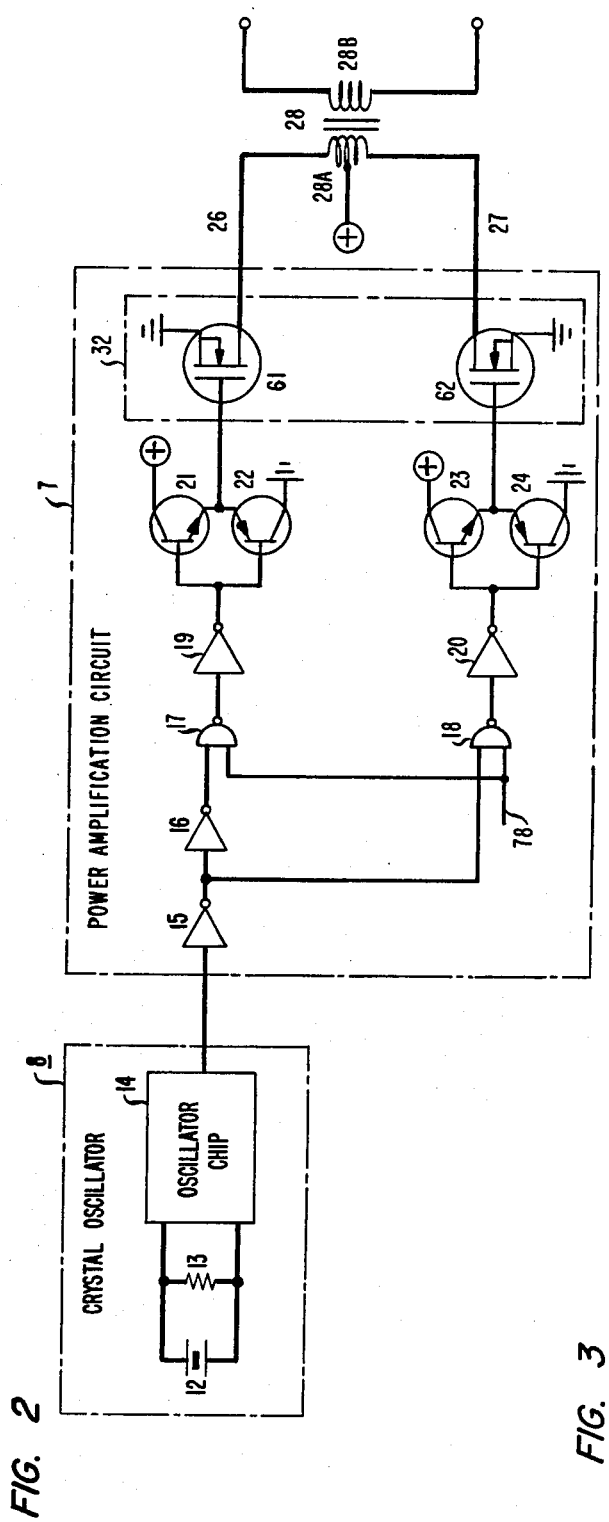
FIG. 2 is a schematic diagram of the power system and discloses in greater detail the frequency generation and power amplification circuits shown in block diagram in FIG. 1.
FIG. 3 discloses in particular detail the circuitry associated with the PDC shown in block diagram in FIG. 1.

FIG. 2 provides a detailed schematic diagram of the crystal oscillator 8 and the power amplification circuit 7 in the power system 9. Crystal oscillator 8 comprises crystal 12, resistor 13, and oscillator chip 14 and provides a 2.0 MHz square wave signal to an inverter gate 15 in the power amplification circuit 7. Power amplification is provided by a power amplifier 32 comprising metal oxide semiconductor field-effect transistors (MOSFETs) 61 and 62 which are alternately turned on and off at a 2.0 MHz rate. These MOSFETs thereby provide a square wave signal to the load presented by the primary winding 28A of transformer 28. Inverter/buffer gates 15, 16, 19, and 20 and NAND gates 17 and 18 provide three functions:

A. buffering of the 2.0 MHz square-wave signal provided by the crystal oscillator 8;

B. provision of proper signals to MOSFETs 61 and 62 (gate signals to MOSFETs 61 and 62 are inversions of each other); and C. provision of a means to turn off the power amplifier 32 and stop all power transfer to the PDC.

Bipolar transistor pairs 21 and 22, and 23 and 24 are noninverting drivers which provide sufficient drive current to switch MOSFETs 61 and 62 on and off at high speeds (<50 ns). Both MOSFETs are connected to the primary of the center-tapped transformer 28 which has its center tap connected to a positive dc supply voltage. Gate signals for the MOSFETs are phased such that MOSFET 61 is turned on (drain to source current flowing) whenever MOSFET 62 is turned off (no drain to source current flowing) and vice versa. Currents flowing in the two halves of the primary winding 28A of transformer 28 set up an alternating current in the secondary winding 28B of the transformer 28 which is delivered through the series resonant circuit to the PDC. The "on" resistance of the MOSFETs and the load on the secondary of transformer 28 both determine the level of current supplied by the power amplifier 32. Even though a square-wave signal is used in this embodiment to achieve high amplifier efficiency, it is anticipated that those skilled in the art will recognize that a sine wave could easily be substituted.

Referring once again to FIG. 1, the signal voltage from the power amplification circuit 7 is stepped up by transformer 28 so as to have a large enough voltage to provide the required dc supply on the PDC 11. The secondary of this transformer provides some of the series inductance for the series resonant circuit. The variable crossfield inductor 29 (to be discussed later)

provides the remainder of the series inductance for the resonant circuit. The series capacitance in the resonance circuit is formed by mating parallel plates comprising the interface between the reader system in the station and the PDC 11. These plates are separated by a dielectric material and brought together to form two capacitors 30 and 31. The crossfield inductor 29 is tuned so that $$L = 1/(4(\pi f)^2 C)$$

where f = 2.0 MHz, the fundamental frequency,
C = series capacitance of the capacitors, at PDC interface 30, 31, and L = series inductance of both the transformer secondary 28B and crossfield inductor section 29B.

The reactances of the series capacitance C and the series inductance L cancel each other at this fundamental frequency. The remaining components in the power system side of the resonance circuit, that is, the parallel diode pairs 33 and 34, provide a temperature compensated current shunt to the automatic tuning system 10 for the ac current flowing in the series resonant circuit and used in the ac-to-dc converter 66. These diodes have a negligible loading effect on the resonant circuit. At resonance, therefore, practically all of the energy at the fundamental frequency (2.0 MHz), provided by the power system 9, is delivered to the PDC 11.

Referring now to FIG. 3, there is contained within the PDC 11 a diode bridge 35 which provides full-wave rectification of the signal on lines 72 and 73. After this rectification stage, the remaining ac components are removed by the filter capacitor 36 thereby providing a constant operating dc voltage for a resistive equivalent load 75 presented by the active and passive PDC components, including microcomputer, EEPROM memory, data receiver, decoder, and data transmitter circuits in the PDC 11. The voltage reference and regulator 37 maintains this voltage at the desired level.

In addition to providing dc operating power, a part of the 2.0 MHz signal is taken from the interface capacitor plates 30-31, and used as a reference clock signal for the microcomputer (not shown) on the PDC 11. Series capacitor 38A adjusts the dc component of the signal and resistor 38B limits the current. A Schmitt trigger inverter 39 clips the signal to an acceptable level for the CMOS clock input of the microcomputer.

As earlier indicated, the crossfield inductor 29 provides part of the series inductance for the series resonance circuit. By varying the dc current applied to control winding 29A, the inductance of signal winding 29B is changed. The crossfield inductor concept is described more fully in an article by T. A. O. Gross, "Revisiting the cross-field inductor," *Electronic Design*, Mar. 15, 1977, pages 82–85.

Figure 4:
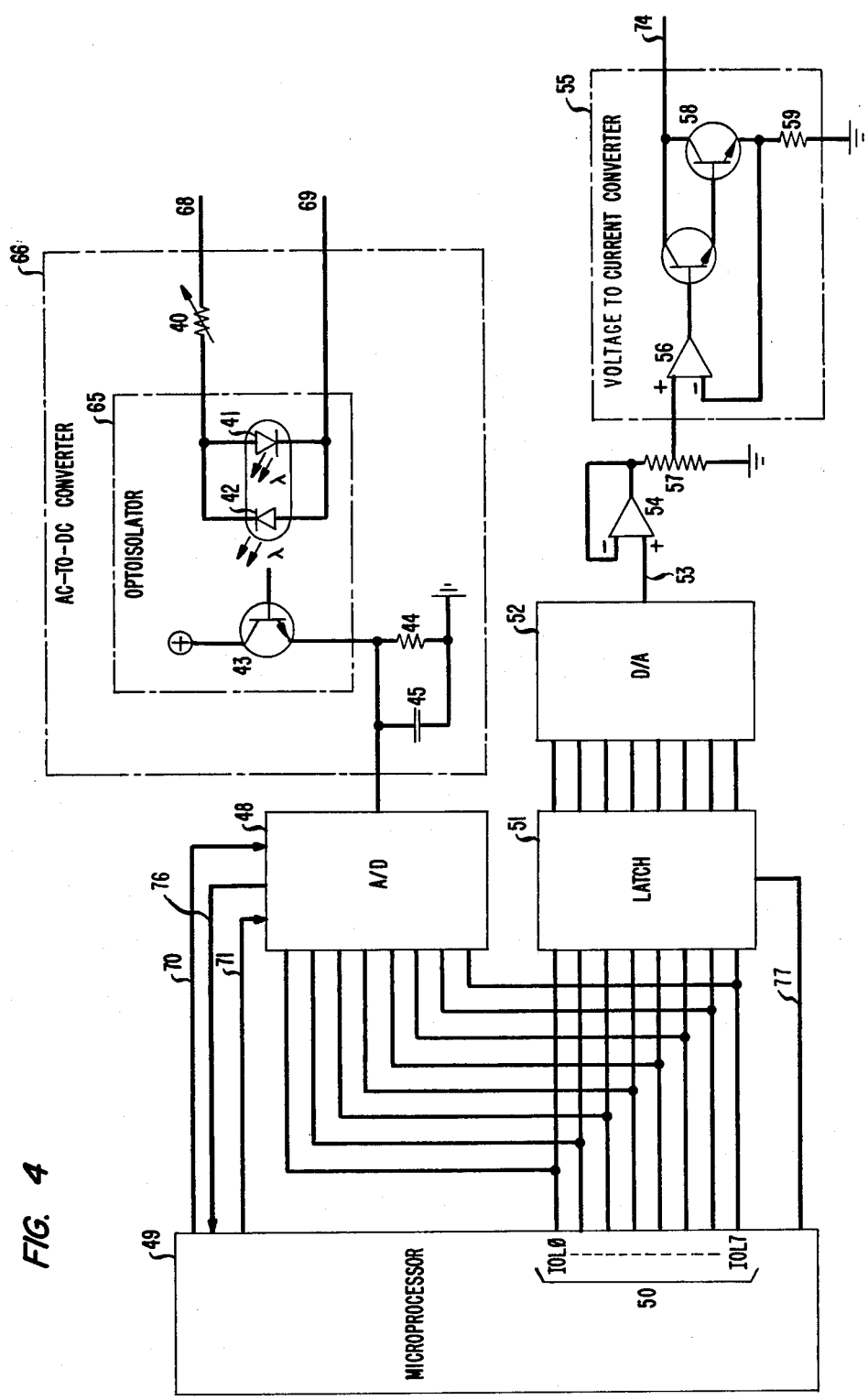
FIG. 4 is a schematic diagram of the automatic tuning system and discloses the detailed circuitry associated with the block diagram of FIG. 1.

FIG. 4 shows in particular detail the components of the automatic tuning system 10. The current which does not flow through parallel diode pairs 33 and 34 (FIG. 1) passes through lines 68 and 69 to the ac-to-dc converter 66. This signal is impressed across a variable resistor 40 and the parallel combination of two light-emitting diodes 41, 42 of optoisolator 65. The resistor 40 is used to control the amount of current through the light-emitting diodes. The diodes are connected in such a way as to generate light whose intensity is proportional to forward current for both positive and negative half cycles of the ac current flowing in the series-resonant loop. Since the light is summed (because both diodes are optically-coupled to the same phototransistor), an "absolute value" process is accomplished. The electromagnetic radiation produced by these diodes 41, 42, impinging on the base region of the phototransistor 43 of optoisolator 65 causes carriers to be injected. The base-emitter junction of transistor 43 possesses a capacitance which causes storage of charge carriers and consequent integration of the current signal. This integration is negligible for small frequencies, but since the incoming frequency is on the order of 2.0 MHz, the base-emitter junction capacitance allows only the dc signal to pass. The current through transistor 43 develops a varying voltage across a resistor 44 and a capacitor 45 filters out ac noise.

The output of the ac-to-dc converter 66 is fed to an A/D converter 48 which provides a digital output signal via an eight-bit data bus for reading by a microprocessor 49. A number of commercially available microprocessors are suitable for use as microprocessor 49, for example, a microprocessor commercially available from Western Electric as Part No. BELLMAC-4 can be used for microprocessor 49 with the proper programming.

Sampling of the series resonant loop current by the microprocessor 49 is achieved by sending the proper write control signal over line 70 to the A/D converter 48, which causes the analog signal to be sampled and converted to an eight-bit digital signal. An interrupt from the A/D converter 48 on line 76 tells the microprocessor when conversion is done. And with a read control signal on line 71 from the microprocessor 49, the eight-bit signal is inputted to eight input-output (I/O) latches 50 on the microprocessor 49 via the eight-bit data bus.

The inductance value of crossfield inductor 29 in FIG. 1 is set by the microprocessor 49 outputting an eight-bit signal through the I/O latches 50. This signal is held in an external latch 51 which receives a write control signal from the microprocessor on line 77 and provides an output directly to a D/A converter 52. This converter 52 is held in the convert mode so that an analog signal is always present at its output on line 53. This analog signal is buffered by a unity-gain operational amplifier 54 before coupling to a voltage-to-current converter 55.

Converter 55 works in the following way: A fraction of the buffered analog signal from the D/A converter 52 is coupled to operational amplifier 56 from the wiper arm of a potentiometer 57. A Darlington pair transistor 58 is driven by the output of this operational amplifier 56 and provides dc current to control the crossfield inductor 29 over line 74. This value of dc current is set by a resistor 59 connected between the Darlington stage 58 and ground. Voltage on the resistor is held constant by the inverting terminal of the operational amplifier 56. Since the output voltage of operational amplifier 56 is a finite level less than the dc supply level, it is in linear operation and its open loop gain characteristics produce a so-called "virtual short" between its inverting and noninverting inputs. It is by this means that current supplied to the crossfield inductor control winding 29A is determined by the sampled voltage from the D/A converter 52. Thus, the automatic tuning system 10 includes components which comprise a feedback loop, i.e., the current initially provided by the diode pairs 33 and 34 to the ac-to-dc converter 66 is used in determining the current supplied to the crossfield inductor 29 by the voltage-to-current converter 55.

In operation of the automatic tuning system 10, when the PDC 11 is initially placed against the station window, the microprocessor 49 successively sets the signal winding 29B of the crossfield inductor 29 to each of 255 possible values of inductance by varying the dc current applied to the control winding 29A and measuring the resulting power system current through the parallel diode pairs 33 and 34 at each setting.

Microprocessor 49 retains the value of the setting at which maximum current is measured. Once through the initial scan, the microprocessor 49 removes power from the PDC 11 by providing an amplifier shutoff signal over line 78 to NAND gates 17 and 18 in the power amplification circuit 7 as shown in FIG. 2. After allowing time for the system to settle (500 ms), the crossfield inductor is set to the resonant value at which maximum current was measured. The power amplifier is then turned on, bringing the PDC to life at its peak power point. It is possible to check the system periodically by measuring the current at several points around the peak setting, and adjusting as necessary to compensate for capacitance fluctuations.

One skilled in the art may make various substitutions and changes to the arrangement of parts shown without departing from the spirit and scope of the invention as herein defined by the appended claims.

What is claimed is:

1. An automatic tuning arrangement for maximizing power transfer from a signal source to a complex load impedance including a resistive component, the arrangement comprising:
    means for connecting said signal source to the resistive component of said complex load impedance;
    capacitive coupling means (30, 31) connected in series between said source and said load impedance;
    sensing means (33, 34) for providing an electrical signal indication reflective of said power transfer; and
    variable inductance means (29) responsive to the electrical signal from said sensing means and connected in series with said load impedance for nulling the effect of said capacitive coupling means to obtain the desired maximum power transfer.

2. The automatic tuning arrangement as set forth in claim 1 in which said sensing means (33, 34) is connected in series with said load impedance and comprises at least two diodes arranged in a parallel configuration to each other and with opposed low resistance current paths, and ac-to-dc converter means (66) connected in series with said diodes.

3. The automatic tuning arrangement as set forth in claim 2 in which said ac-to-dc converter means (66) further comprises:
    an optoisolator 65 connected to said sensing means and having an output electrode; and
    a parallel configuration of a capacitor (45) and resistor (44) connected in series with said output electrode, a dc voltage being developed across said capacitor (45) proportional in magnitude to the level of the electrical signal across said sensing means.

4. The automatic tuning arrangement set forth in claim 3 further comprising:
    an analog-to-digital converter (48) responsive to the voltage across said capacitor (45) to generate a digital output proportional thereto; and
    a microprocessor (49) responsive to the digital output from said analog-to-digital converter (48).

5. The automatic tuning arrangement set forth in claim 4 wherein the variable inductance means (29) is operatively responsive to the output of said microprocessor, the microprocessor sequentially setting the variable inductance means to each of multiple preselected inductance values, and retaining the value which nulls the effect of said capacitive coupling means.

6. The automatic tuning arrangement set forth in claim 4 further comprising:
    a digital-to-analog converter (52) responsive to the digital output from said microprocessor (49) for generating an analog output proportional thereto; and
    a voltage-to-current converter (55) responsive to the analog output from said digital-to-analog converter to generate a current output proportional thereto.

7. The automatic tuning arrangement set forth in claim 5 in which said variable inductance means (29) includes an electrically variable inductor comprising:
    a control winding (29A) responsive to the output of said microprocessor; and
    a signal winding (29B) arranged in a crossfield arrangement with said control winding (29A), said signal winding (29B) providing series inductance to the tuning arrangement and forming a series resonant circuit with the capacitive coupling means (30, 31) of said complex load.

8. The automatic tuning arrangement set forth in claim 7 in which said capacitive coupling means (30, 31) is formed by bringing into contact surfaces of a memory card and of a card station providing said signal source.

9. The automatic tuning arrangement set forth in claim 1 in which said capacitive coupling means (30, 31) is formed by bringing into contact surfaces of a memory card and of a card station providing said signal source.

10. The automatic tuning arrangement set forth in claim 9 in which said variable inductance means (29) includes an electrically variable inductor comprising:
    a control winding (29A) responsive to the output of said microprocessor; and
    a signal winding (29B) arranged in a crossfield arrangement with said control winding (29A), said signal winding (29B) providing series inductance to the tuning arrangement and forming a series resonant circuit with the capacitive coupling means (30, 31) of said complex load.

11. The automatic tuning arrangement as set forth in claim 10 in which said sensing means (33, 34) is connected in series with said load impedance and comprises at least two diodes arranged in a parallel configuration to each other and with opposed low resistance current paths, and ac-to-dc converter means (66) connected in series with said diodes.

12. The automatic tuning arrangement as set forth in claim 11 in which said ac-to-dc converter means (66) further comprises:
    an optoisolator 65 connected to said sensing means and having an output emitter electrode; and
    a parallel configuration of a capacitor (45) and resistor (44) connected in series with said output emitter electrode, a dc voltage being developed across said capacitor (45) proportional in magnitude to the level of the electrical signal across said sensing means.

13. The automatic tuning arrangement set forth in claim 12 further comprising:

an analog-to-digital converter (48) responsive to the voltage across said capacitor (45) to generate a digital output proportional thereto; and a microprocessor (49) responsive to the digital output from said analog-to-digital converter (48).

14. The automatic tuning arrangement set forth in claim 13 further comprising:
a digital-to-analog converter (52) responsive to the digital output from said microprocessor (49) for generating an analog output proportional thereto; and
a voltage-to-current converter (55) responsive to the analog output from said digital-to-analog converter to generate a current output proportional thereto.

15. The automatic tuning arrangement set forth in claim 14 wherein the electrically variable inductor (29) is operatively responsive to the output of said voltage-to-current converter, the microprocessor sequentially selecting digital levels that set the electrically variable inductor to each of multiple preselected inductance values, and retaining the digital level corresponding to the value which nulls the effect of said capacitive coupling means.

16. The automatic tuning arrangement set forth in claim 8 or 15 in which at least one of each two surfaces brought into contact has a dielectric material affixed thereto so that the dielectric material is juxtapositioned between said surfaces.

* * * * *